(12) United States Patent
Bathiche et al.

(10) Patent No.: US 7,548,677 B2
(45) Date of Patent: Jun. 16, 2009

(54) INTERACTIVE DISPLAY USING PLANAR RADIATION GUIDE

(75) Inventors: Stephen N. Bathiche, Kirkland, WA (US); Dana Lu Silverstein, Duvall, WA (US)

(73) Assignee: Microsoft Corporation, Redmond, WA (US)

(*) Notice: Subject to any disclaimer, the term of this patent is extended or adjusted under 35 U.S.C. 154(b) by 301 days.

(21) Appl. No.: 11/549,010

(22) Filed: Oct. 12, 2006

(65) Prior Publication Data

US 2008/0089090 A1   Apr. 17, 2008

(51) Int. Cl.
G02B 6/10 (2006.01)
G02B 7/14 (2006.01)
F21V 7/04 (2006.01)

(52) U.S. Cl. ........................ 385/129; 359/629; 362/602

(58) Field of Classification Search ................. 362/600, 362/606, 612, 561; 385/129, 901
See application file for complete search history.

(56) References Cited

U.S. PATENT DOCUMENTS

| | | | |
|---|---|---|---|
| 5,106,181 A | 4/1992 | Rockwell, III | 385/2 |
| 5,455,882 A * | 10/1995 | Veligdan | 385/116 |
| 5,953,469 A | 9/1999 | Zhou | 385/22 |
| 6,078,704 A | 6/2000 | Bischel et al. | 385/4 |
| 6,282,029 B1 * | 8/2001 | Ma et al. | 359/629 |
| 6,317,545 B1 | 11/2001 | Veligdan | 385/120 |
| 6,323,833 B1 | 11/2001 | Takeuchi et al. | 345/84 |
| 6,497,946 B1 * | 12/2002 | Kretman et al. | 428/317.9 |
| 6,608,961 B2 | 8/2003 | Travis | |
| 6,650,822 B1 | 11/2003 | Zhou | 385/147 |
| 6,741,779 B2 | 5/2004 | Veligdan | 385/120 |
| 6,869,187 B2 | 3/2005 | Muramatsu | |
| 6,870,671 B2 | 3/2005 | Travis | 359/443 |
| 6,883,919 B2 * | 4/2005 | Travis | 353/81 |
| 6,895,151 B2 | 5/2005 | Biscardi et al. | 385/120 |
| 6,921,452 B2 * | 7/2005 | Veligdan | 156/253 |

(Continued)

FOREIGN PATENT DOCUMENTS

JP   2005-195672 A   7/2005

OTHER PUBLICATIONS

"Flat Panel Time Multiplexed Autostereoscopic Display Using an Optical Wedge Waveguide", C. Moller, A. Travis, Photonics and Sensors, Engineering Department, Cambridge University, Cambridge CB2 1PZ, UK; (copy attached hereto as Article 1).

(Continued)

Primary Examiner—Ali Alavi
(74) Attorney, Agent, or Firm—Workman Nydegger

(57) ABSTRACT

An interactive display that uses a planar radiation guide (such as a planar light guide) to perform display and/or imaging. The planar radiation guide has a radiation propagation portion and a radiation interface portion. The radiation propagation portion propagates the radiation by the principles of total internal reflection (with perhaps some minor leakage). The planar radiation guide also has a radiation interface portion where radiation is more apt to exit or enter the planar radiation guide. The interactive display performs both display and imaging, while the planar radiation guide is used to perform at least one (but perhaps both) of the display and imaging operations.

18 Claims, 7 Drawing Sheets

U.S. PATENT DOCUMENTS

| | | | |
|---|---|---|---|
| 6,948,820 B2 | 9/2005 | Veligdan et al. | 353/38 |
| 7,267,441 B2 * | 9/2007 | Lee et al. | 353/31 |
| 7,293,899 B2 * | 11/2007 | Boyd et al. | 362/296 |
| 2004/0196665 A1 | 10/2004 | Travis | |
| 2005/0122308 A1 | 6/2005 | Bell et al. | 345/156 |
| 2005/0180674 A1 | 8/2005 | Ellwood, Jr. | 385/6 |

OTHER PUBLICATIONS

"Unique Interactive Projection Display Screen", James T. Veligdan, Brookhaven National Laboratory, Upton, New York 11973-5000 (*copy attached hereto as Article 2*).

"Ten Inch Planar Optic Display", Leo Beiser, James Veligdan (*copy attached hereto as Article 3*).

\* cited by examiner

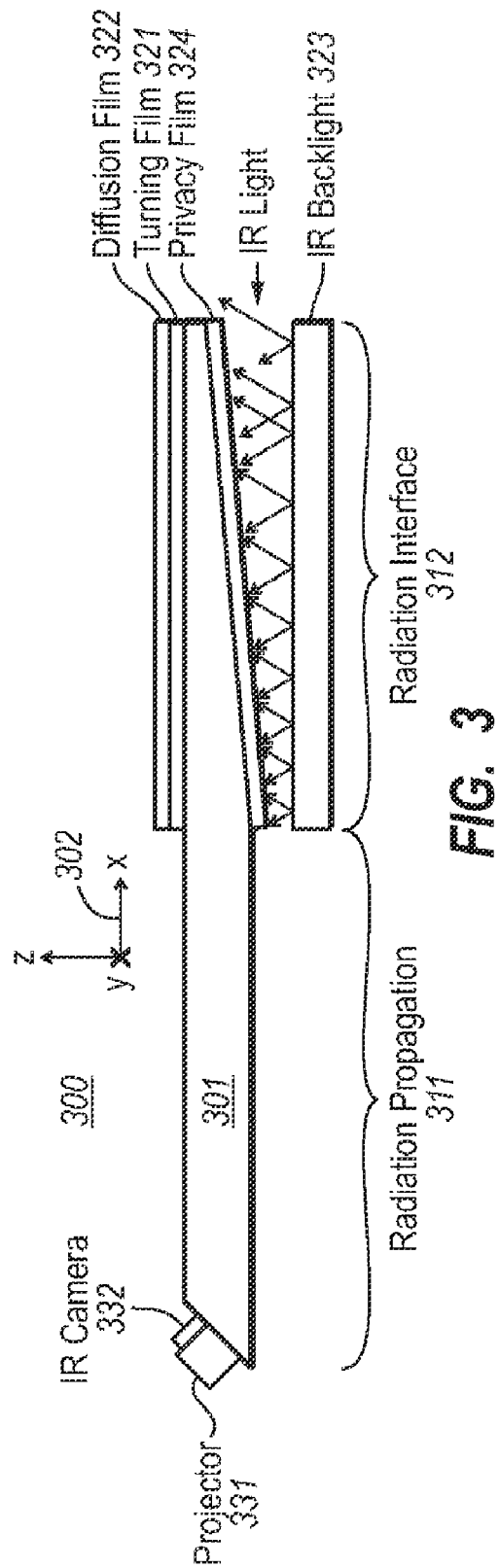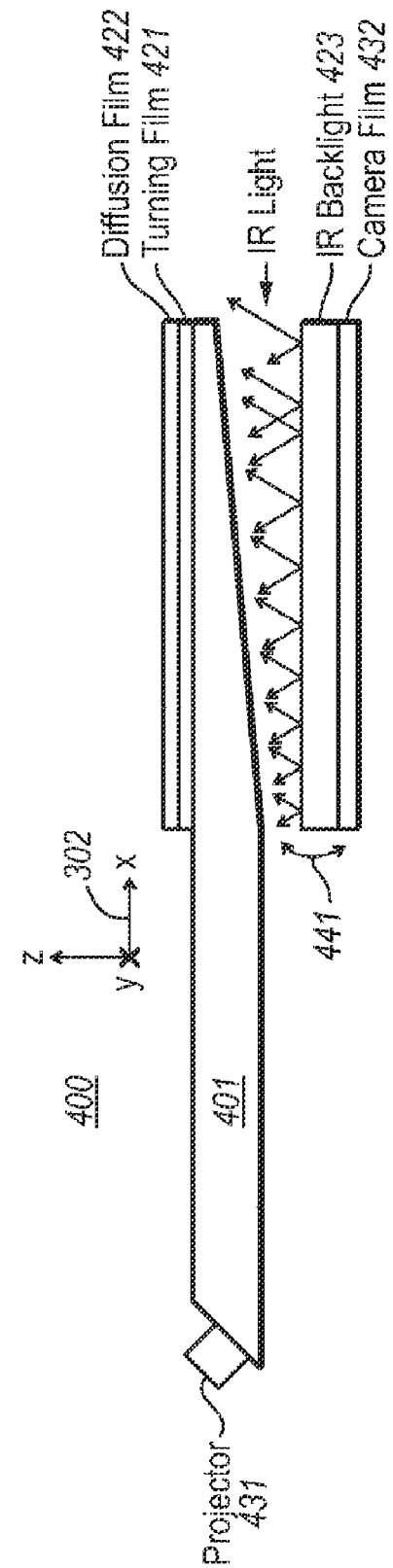

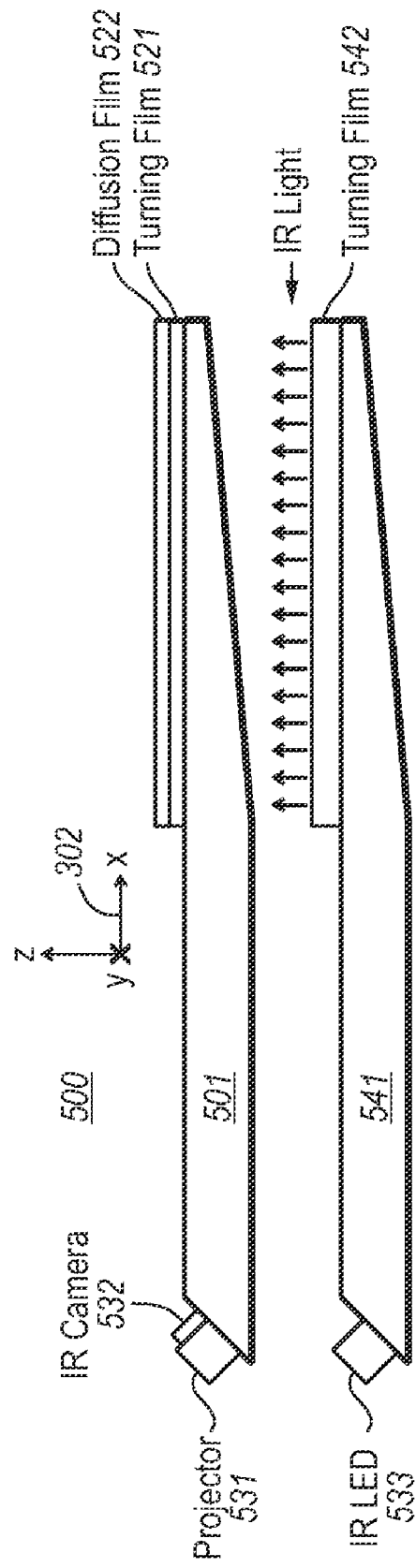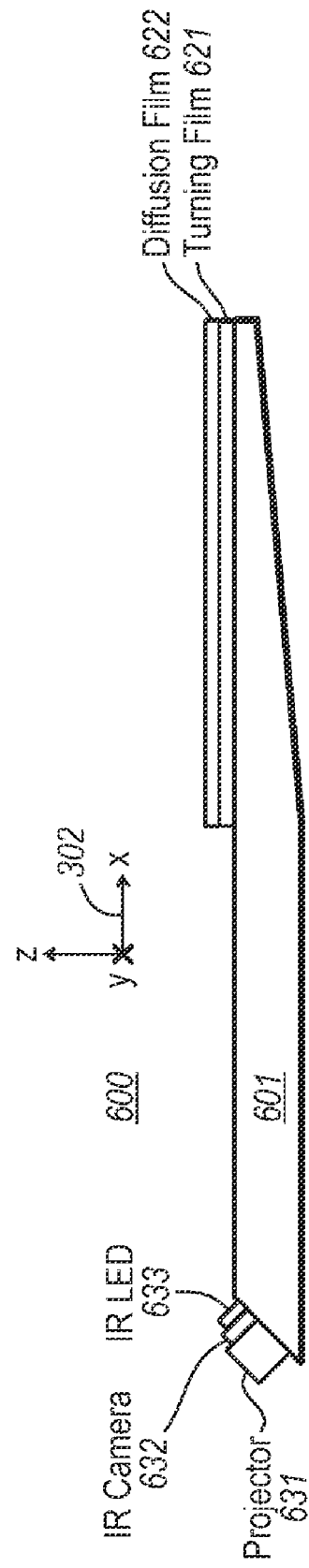
FIG. 5
FIG. 6

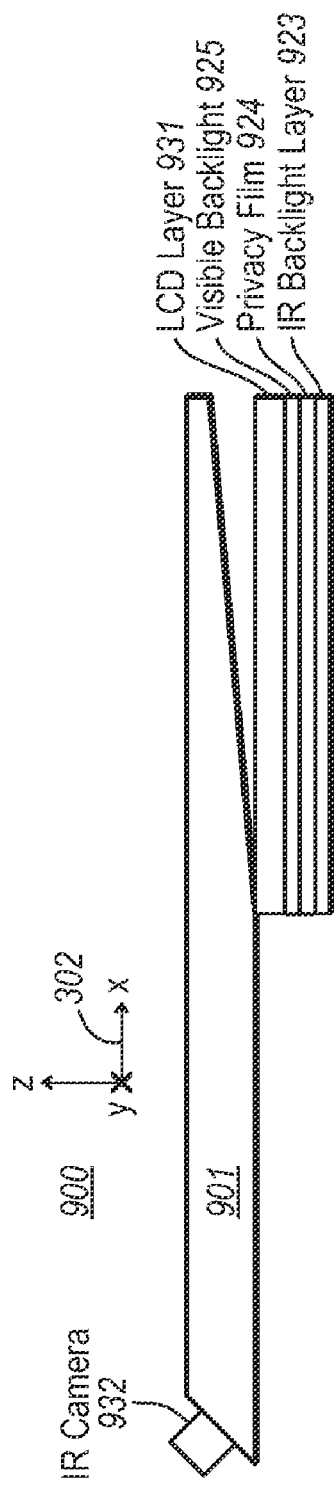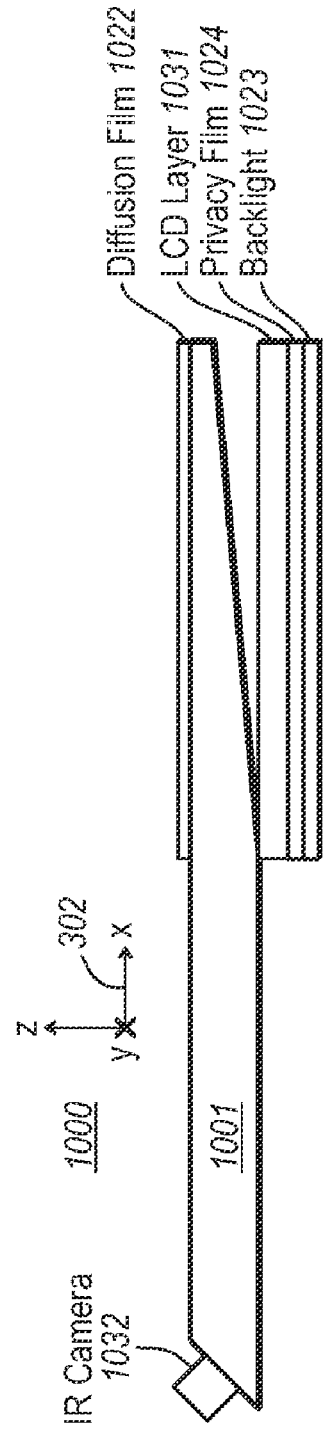

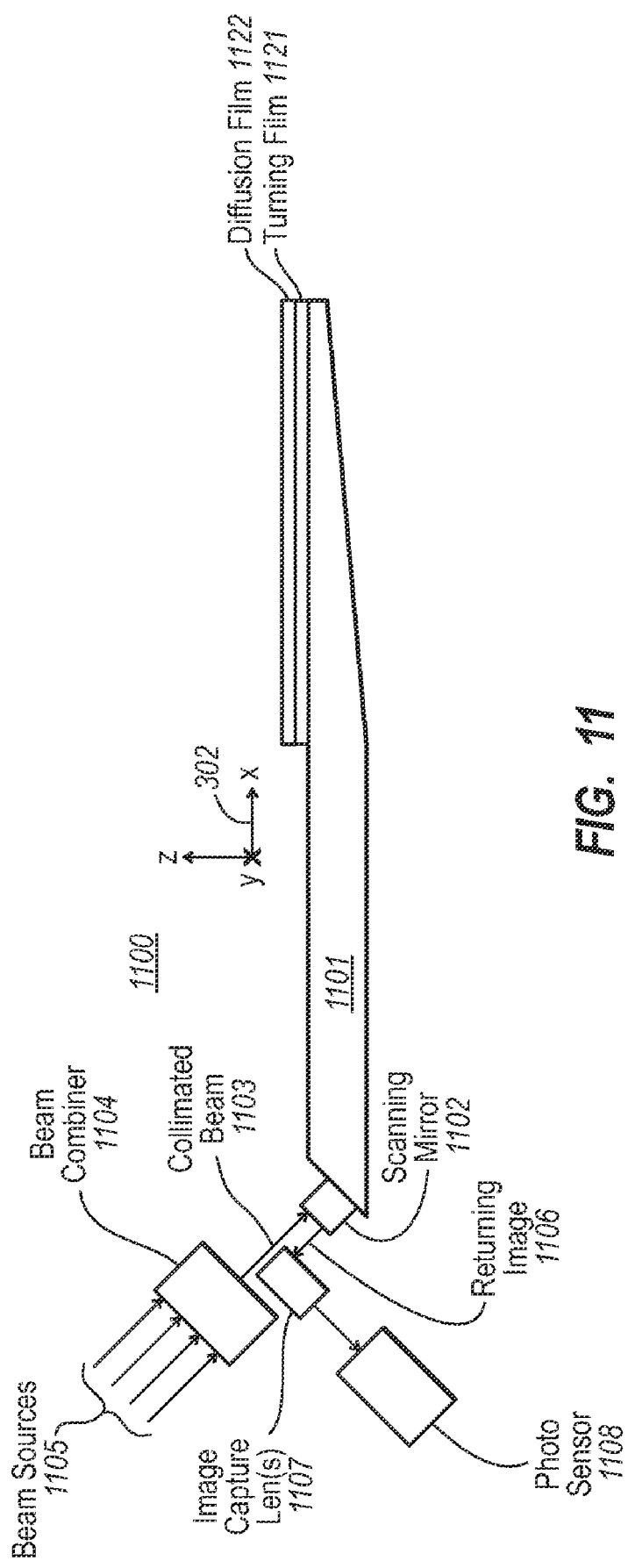

INTERACTIVE DISPLAY USING PLANAR RADIATION GUIDE

BACKGROUND

The functionality of many computing systems relies on effective display of information using a display. More recently, the display has also been used as a direct input device. For instance, a display might be equipped with touch sense resistive and/or capacitive arrays to detect a portion of the display being contacted.

Displays may also be equipped with a camera system that is positioned at some distance behind the display. The camera focuses on objects closer to the display to allow for visual input to the computing system by having the computer visually detect objects interacting with the display. Such "vision capture" technology relies on the presence of some distance between the display panel and the camera system placed behind the display. These vision capture systems are thus quite large, but are quite acceptable for many applications such as projection systems in which the thickness of the display is not critical.

Recently, technology has been made available that allows for high quality displays to be quite thin. For instance, Liquid Crystal Display (LCD) displays are presently in widespread use. Nevertheless, a variety of other thin screen technologies have been developed. One more recent approach is to use a planar light guide as a display.

The planar light guide may be, for example, a sheet of glass or other translucent material such as acrylic. A projector is situated at one end of the planar light guide and projects an image into one end of the sheet. The sheet has an area of a thickness that allows the image to propagate and expand. The thickness may be uniform, vary linearly, or vary non-linearly, so long as the image is permitted to propagate. The image propagates due to total internal reflectance so long as the angle of reflection is below a critical angle defined by the index of refraction of the light guide material and the index of refraction of the ambient surrounding material.

The expanded image is then received into a region of non-uniform thickness, comparable to a wedge shape, where the thickness of the material is gradually reduced. As the image progresses into the wedge, the angle of reflection becomes sharper and sharper approaching the critical angle until total internal reflection can no longer be maintained when the angle of reflection first exceeds the critical angle. At that stage, the light exits the material. The position that the light exits the display will depend on the angles at which the light was projected into the planar light guide.

The planar light guide is used as a display device. In one case, the planar light guide is provided as a structure to perform X-ray imaging. X-rays that pass through an object are received at the planar light guide at the portion of non-uniform thickness. A film is positioned on the wedge portion where it is exposed to the X-ray light. Visible light, on the other hand, is directed along the inside of the planar light guide in the portion of relatively uniform thickness by the principles of total internal reflection. The visible light is then captured by a camera positioned at the edge of the planar light guide. However, the planar light guide is not used in an interactive display that integrates both display and imaging functionalities.

BRIEF SUMMARY

Although not required, embodiments of the present invention relate to an interactive display that uses a planar radiation guide (for example, a planar light guide) to perform display and/or imaging. Examples of radiation include infrared, visible and ultraviolet light, but the principles of the present invention are broad enough to operate with radiation within any frequency range of electromagnetic radiation. The planar radiation guide has a radiation propagation portion and a radiation interface portion. The radiation propagation portion propagates the radiation by principles of total internal reflection. The planar radiation guide also has a radiation interface portion where radiation is more apt to exit or enter the planar radiation guide.

The interactive display includes a display mechanism for outputting radiation from the area of the radiation interface portion. However, this does not mean that the display mechanism must use the planar radiation guide to display. Nonetheless, if the display mechanism does use the planar radiation guide to display, the display mechanism uses the radiation propagation portion of the planar radiation guide to propagate radiation to be displayed, and uses the radiation interface portion of the radiation guide to emit such radiation at controlled areas of the radiation interface portion. If the radiation were visible light, for example, the radiation interface portion might thus be used as a user display.

The interactive display includes a camera mechanism for receiving radiation at the area of the radiation interface portion. This does not mean that the camera mechanism must use the planar radiation guide to image. Nonetheless, if the camera mechanism does use the planar light guide to image, the camera mechanism uses the radiation interface mechanism of the planar radiation guide to receive radiation and uses the radiation propagation portion to propagate at least a portion of such received radiation to the camera.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The appended drawings are used in order to more particularly describe embodiments of the present invention. Understanding that these drawings depict only typical embodiments of the invention and are not therefore to be considered to be limiting of its scope, the embodiments will be described and explained with additional specificity and detail through the use of the accompanying drawings in which:

FIG. 3 illustrates a side-view of a planar radiation guide that uses the planar radiation guide to both display and image, but in which the backlight is provided independent of the planar radiation guide;

FIG. 4 illustrates a side-view of a planar radiation guide that uses the planar radiation guide to display, but a camera layer to image;

FIG. 5 illustrates a side-view of a pair of planar radiation guides in which the upper planar radiation guide is used to both display and image, and the lower planar radiation guide is used as a backlight;

FIG. 6 illustrates a side-view of a planar radiation guide in which the display, imaging, and backlight functions are all accomplished using the planar radiation guide;

FIG. 9 illustrates a side-view of a planar radiation guide in which an LCD layer is placed below the radiation interface portion in order to display, but in which the planar radiation guide is used to image;

FIG. 10 illustrates a side-view of a planar radiation guide that uses a diffusion film above the radiation interface portion and in which an LCD layer is placed above the radiation interface portion in order to display, but in which the planar radiation guide is used to image; and FIG. 11 illustrates a side-view of a planar radiation guide that uses integrated image display and capture scanning.

DETAILED DESCRIPTION

Embodiments of the present invention extend to an interactive display that performs both display and imaging operations. At least one of the display and imaging operations uses a planar radiation guide (i.e., a "planar light guide" if the radiation is light). The planar radiation guide may be quite thin, and can be used to control where radiation is emitted (and/or detected if used to image) by the planar radiation guide. Accordingly, a thin interactive display is enabled in which objects in contact with (or in front of) the display may be imaged to provide input to the system. Accordingly, the display and imaging interfaces may be co-located.

Figure 1:
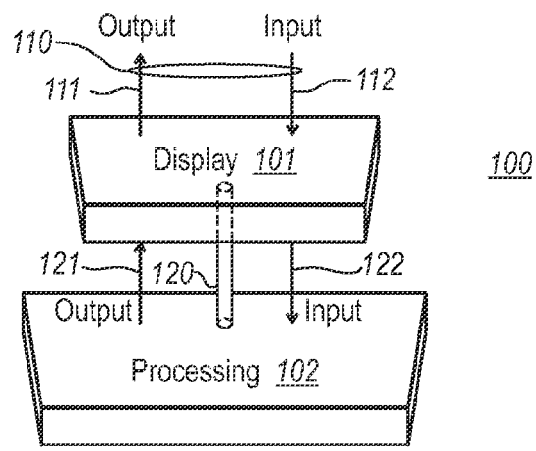
FIG. 1 illustrates a system that includes an interactive display and a processing system in accordance with the principles of the present invention.

FIG. 1 schematically illustrates a general system 100 that includes a display 101 and processing components 102 that are interconnected as represented by connection 120. The processing components 102 may process information using hardware, software, or a combination of hardware and software.

When information is to be displayed on the display 101 in the form of an image, the processing components 102 output the information (as represented by output arrow 121) to the display 101. The display 101 appropriately renders the information (as represented by arrow 111) in the form of emitted electro-magnetic radiation such as, for example, light. The displayed image is defined by spatially-dependent intensity and frequency of the various radiation emitted across the display area at a given point in time. Of course, the image may vary over time.

Typically, a display might output such radiation in the form of visible light, most especially if a human being is to directly observe the display. However, the principles of the present invention are not limited to a display that outputs visible light. Accordingly, as an alternative or in addition to displaying visible light, the display 101 might emit images of other frequencies of electro-magnetic radiation. In this description and in the claims, the term "display" is defined as the emission of any electro-magnetic radiation, regardless of whether such radiation is in the visible spectrum.

In this description, and in the claims, reference is made to "radiation" which is defined herein as including any electro-magnetic radiation of any frequency. The term "light" will be used herein interchangeably with the term "radiation", and unless modified by a descriptor of its frequency spectrum, means any type of radiation, regardless of whether such radiation is visible to a human. Thus, "light" means any electromagnetic radiation, "infrared light" means any electro-magnetic radiation in the infrared spectrum, "visible light" means any electro-magnetic light in the visible spectrum, "ultraviolet light" means any electro-magnetic radiation in the ultraviolet spectrum, "X-ray light" means any electro-magnetic radiation in the X-ray spectrum, and so forth for all other frequency classifications. The term "visible or near visible light" is defined as infrared, visible, or ultraviolet light.

The display 101 is interactive and thus has a user interface 110 that not only includes the capability to output 111 a displayed image, but also has the capability to receive input 112 via the display 101. For instance, an object may be placed in contact with or in front of the display 101 to allow the display to receive image information for the object. The image information is then provided as input 122 to the processing components 102. The processing components 102 may then use as that information to perform further functionality or to perhaps even affect what is later displayed. Thus, an interactive experience may be achieved by using the display 101 as an output and input device in which the display and imaging interfaces are co-located.

Interactive displays may be used in any system for which it would be of advantage, regardless of the form factor of the system, and regardless of whether that form factor now exists or is to be conceived in the future. The principles of the present invention are simply not restricted to any particular form factor. Accordingly, FIG. 1 only symbolically represents components of a display system and various information flows, and does not represent dimensionally any physical system in particular.

To illustrate this principle, the interactive display might be incorporated into a standard desktop computer, a laptop computer, a handheld device, a music player, a bar-code scanner, a home security system, a fast food restaurant food order system, a wristwatch, and so forth infinitum. The display might be quite small, but there are many applications in which it would be useful for the display to be quite large.

For instance, a virtual air hockey table might be created in which the display represents the entire area of play, having a length and width each of multiple feet. The displayed image might include two goals, various field markers, and a hockey puck. A user might use a physical paddle (or perhaps just a hand) to contact the display to provide information regarding where the virtual paddle is. The underlying processing may simulate appropriate movement of the puck given the virtual paddle movement and given the prior motion of play. With appropriate user input, the virtual hockey table might be transformed into an architect and landscape layout that allows the user to construct virtual buildings and landscapes using a large display.

In any case, the form of the system and the display is not important to the broader principles of the present invention. This is particularly true since the principles of the present invention may allow the display to be quite thin, although not required. Thus, even very small and/or thin systems may incorporate the principles of the present invention. The concept is thus quite versatile and independent of the form factor of the overall system and/or the displayed dimensions or shape of the display.

As previously explained, the display 101 is interactive in that it includes both a display mechanism and an image capture mechanism that captures images of objects in contact with or in front of the display 101. However, although not apparent from FIG. 1, the display 101 of FIG. 1 includes a planar radiation guide. As will be apparent from the example embodiments that will be explained in detail below, at least one of (and in some cases both of) the display mechanism and the imaging mechanism use the planar radiation guide.

Figure 2A:
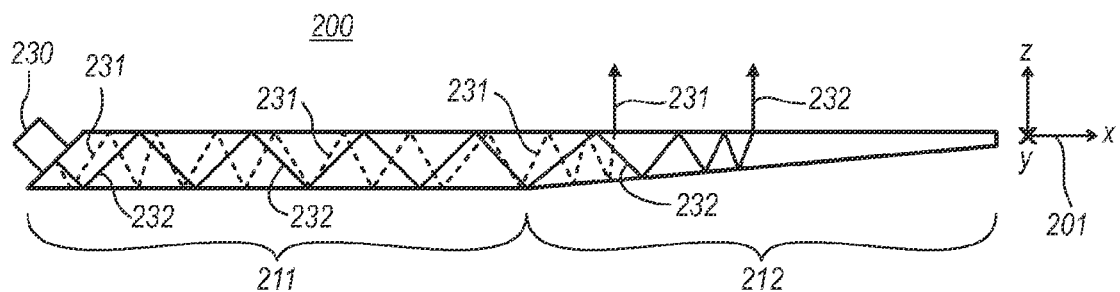
FIG. 2A illustrates a side-view of a conventional planar radiation guide in accordance with the prior art.
Figure 2B:
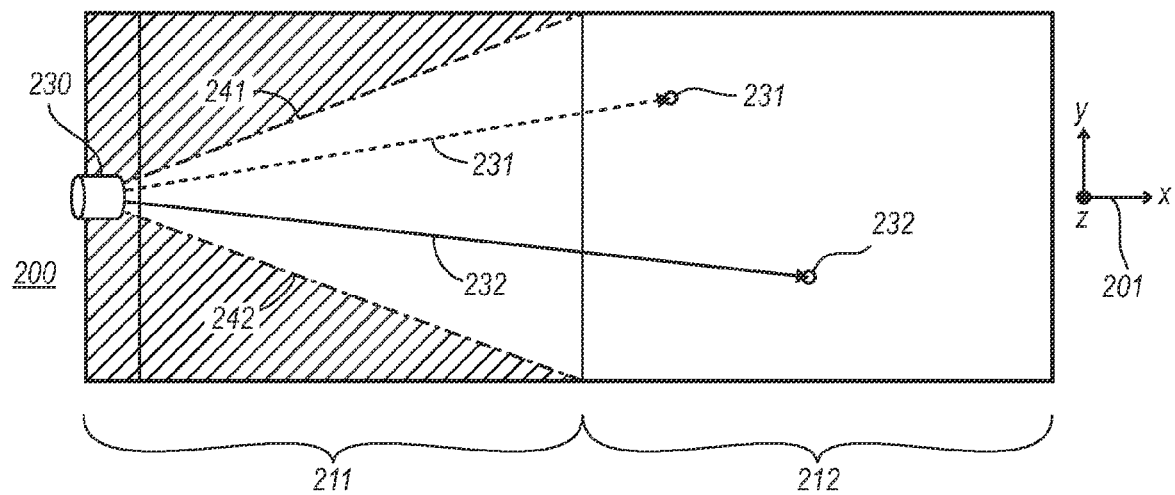
FIG. 2B illustrates a top-view of the planar radiation guide of FIG. 2A.

The principles of operation of the planar radiation guide as a display mechanism will be first explained with respect to FIGS. 2A and 2B. FIG. 2A shows a side view of a planar radiation guide 200 in which a reference Cartesian coordinate system 201 is shown illustrating the x-axis as extending rightward, the y-axis as extending down perpendicular to and down from the plane of the page, and the z-axis as extending upward. FIG. 2B shows a top view of a planar radiation guide 200 using the same coordinate system 201. However, in the case of FIG. 2B, while the x-axis extends rightward, the top view of FIG. 2B causes the y-axis to extend upward, and the z-axis to extend up perpendicular to and up from the plane of the page. The usage illustrated in FIGS. 2A and 2B of a planar light guide to display an image is known in the art. Nevertheless, a discussion of the physical principles of such a display will be helpful in understanding the embodiments of the present invention discussed with respect to FIGS. 3 through 10.

In this description and in the claims, the terms "upwards", "above", or "on top of" when referring to a planar radiation guide refer to the positive z-direction with respect to the coordinate systems 201 (see FIGS. 2A and 2B) and 302 (see FIGS. 3-10). In other words, a first object is "above" a second object if the first object is closer to the viewer of the displayed image. In contrast, the terms "downward", "below" or "underneath" when referring to a planar radiation guide refer to the negative z-direction with respect to the coordinate systems 201 and 302.

Referring to FIGS. 2A and 2B, the planar radiation guide 200 has a radiation propagation portion 211 and a radiation interface portion 212. A projector 230 is situated on the left end of the radiation propagation portion 211 and emits an image into the left edge of the radiation propagation portion 211 of the planar radiation guide 200. Although an entire image is projected into the planar radiation guide, only two rays of radiation 231 and 232 are illustrated for purposes of clarity in describing general principles of display using a planar radiation guide. For instance, referring to FIG. 2B, an image may be emitted by the projector 230 anywhere between the radial angles 241 and 242. Accordingly, the material (illustrated as cross hatched) of the planar radiation guide 200 that are at a wider angle than radial angles 241 and 242 might not be used to propagate radiation.

The radiation propagation portion 211 is dimensioned such that the image propagates through the entire length of the radiation propagation portion 211 by principles of internal reflection. Conventionally, the radiation propagation portion 211 is of uniform thickness. Thus, so long as angle of reflection for a particular ray of radiation is no greater than a critical angle, that ray simply reflects back into the radiation propagation portion 211. As the term is used herein, a "reflection angle" or "angle of reflection") of propagating radiation is the angle between the direction of motion of the radiation and the surface of the planar radiation guide that the radiation will encounter next. The critical angle is a function of the index of refraction of the material of the planar radiation guide 211 and a function of the index of refraction of the surrounding material. Accordingly, as seen in FIG. 2A, although rays 231 and 232 have different reflection angles, the reflection angles are both initially below the critical angle, and thus the rays 231 and 232 propagate through the radiation propagation portion 211 through internal reflection. In fact, the entire image to be displayed is kept below the critical angle throughout the radiation propagation portion 211, so as to deliver the image information to the radiation interface portion 212.

The radiation interface portion 212 is of non-uniform thickness. Conventionally, this non-uniform thickness area might take the form of a full or partial wedge as illustrated in the case of FIGS. 2A and 2B, but as best seen in FIG. 2A. The illustrated case shows the case in which the thickness varies linearly, but the thickness variation may be piece-wise linear or non-linear as well. With each internal reflection of a ray into the wedge-shaped radiation interface portion, the reflectance angle becomes wider and wider, until the angle is greater than the critical angle. Once that occurs, internal reflection cannot be sustained, and the ray will exit the planar radiation guide. Although the ray is illustrated as exiting in the exact direction of the z-axis, conventional planar radiation guides use a turning film and a diffusion film to ensure proper display. The embodiments of the present invention described below may also use such turning and diffusion films as will be apparent from the example embodiments described with respect to FIGS. 3 through 10.

Referring back to FIG. 2A, the distance from the projector 230 that the ray will exit will depend on the initial reflectance angle for that ray. For instance, ray 231 exits much closer to the projector 230 than does the ray 232, since the ray 231 had a wider reflectance angle when emitted from the projector 230. As apparent from FIG. 2B, the projector 230 also controls the radial angle (i.e., the angle with respect to the x-z plane). Accordingly, by careful control of the reflection and radial angles of all radiation rays representing the image, a clear image can be displayed from the radiation interface portion 212 of the planar radiation guide 200.

Figure 2C:
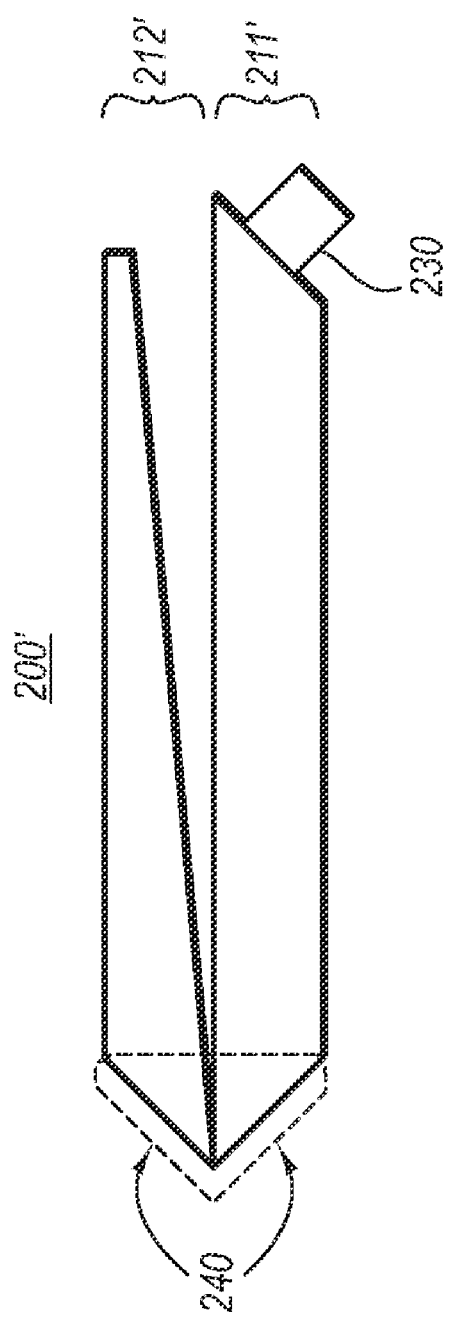
FIG. 2C illustrates a side-view of a folded planar radiation guide in accordance with the prior art.

FIG. 2C illustrates that the planar radiation guide may be optically folded in the form of planar radiation guide 200'. The planar radiation guide uses coupled prisms 240 to reverse the direction of flow of the radiation as the radiation transitions from the radiation propagation portion 211' to the radiation interface portion 212'. This allows for efficient use of system space by permitting the user interface portion of the display to be accessible, while hiding other components of the display. As an alternative or in addition, conventional practice often allows for "tiling" in which multiple projectors may be used, each responsible for expanding images to different portions of the display. This permits the radiation propagation portion to be shorter.

In contrast to FIGS. 2A and 2B, although the interactive displays in accordance with the principles of the present invention use a planar radiation guide, the interactive display includes both a display mechanism and an imaging mechanism. The display mechanism outputs radiation from the area of the radiation interface portion of the planar radiation guide, but does not necessarily use the planar radiation guide to display.

In this description and in the claims, radiation being emitted or output "from the area" of the radiation interface portion means either the radiation is either 1) emitted directly from the radiation portion or from the area above the radiation interface portion. Thus, in accordance with this definition, the image might originate from below the radiation interface portion or from above the radiation interface portion, or may originate by propagation through the radiation propagation portion of the planar radiation guide.

If the display mechanism does use the planar radiation guide to display, the display mechanism uses the radiation propagation portion to propagate radiation to be displayed, and emits at least a portion of that propagated radiation from the radiation interface portion of the planar radiation guide.

On the other hand, the imaging mechanism captures radiation received at the area of the radiation interface portion of the planar radiation guide. In this description and in the claims, radiation being received "at the area" of the radiation interface portion means either the radiation is received by the radiation interface portion or received by an imaging component in the front of the radiation interface portion. Thus, in accordance with this definition, the image might be received above or below the radiation interface portion, or may be received by the radiation interface portion for propagation through the radiation propagation portion of the planar radiation guide.

If the imaging mechanism does use the planar radiation guide to image, the imaging mechanism uses the radiation interface portion to receive radiation and propagates at least a portion of such received radiation down the radiation propagation portion of the planar radiation guide.

Several embodiments of the invention will now be described with respect to FIGS. 3 through 10. In each of these embodiments, for clarity, the planar radiation guide will be illustrated as being in unfolded form. However, any one or all of these embodiments may also include an optical fold (for example, as illustrated with respect to FIG. 2C), or perhaps may include multiple optical folds. In addition, directional references with respect to each of the FIGS. 3 through 11 will be with respect to the reference Cartesian coordinate system 302, which is the same as the coordinate system 201 of FIGS. 2A and 2B for consistency.

FIG. 3 illustrates an interactive display 300 that includes a planar radiation guide 301 that includes a radiation propagation portion 311 and a radiation interface portion 312. The radiation propagation portion 311 is illustrated as having a substantially uniform thickness. The same is true of the other radiation propagation portions illustrated in FIGS. 4 through 11, although in FIGS. 4 through 11, the radiation propagation portion is not specifically labeled to simplify the drawings and avoid redundancy. However, the radiation propagation portion need not have uniform thickness so long as at least a portion of at least a representation of the image projected by the projector is received at the radiation interface portion if the planar radiation guide is used to display. Furthermore, if the planar radiation guide is used to image, the radiation propagation portion needed not have uniform thickness so long as at least a portion of a representation of an image received at one end of the radiation propagation portion is received at the other end of the radiation propagation portion. Regardless of the thickness uniformity of the radiation propagation portion, the thickness profile is taken into consideration when projecting an image, if any, or capturing an image, if any, using the planar radiation guide.

The radiation interface portion 312 is illustrated as having a truncated as wedge shape. The same is true of the other radiation propagation portions illustrated in FIGS. 4 through 11, although in these latter figures, the radiation propagation portion is not specifically labeled. However, the radiation interface portion need not have this shape so long as the projector takes the shape into consideration when transmitting an image, if any, and so long as the camera takes the shape into consideration when capturing an image, if any. In any case, the radiation interface portion is where the image is displayed, and where the image is captured, regardless of whether or not the planar light guide is used.

In order to operate (i.e., display or image) on one frequency spectrum rather than another, it may be useful to adjust the dimensions of the planar radiation guide to ensure proper internal reflection, emission and capture of the desired radiation. This will be apparent to one of ordinary skill in the field of optics after having read this description. Accordingly, specific dimensions for the planar radiation guide will not be described herein. In essence, there are no preferred dimensions that are contemplated due to the wide variety of applications and frequency spectrums that are anticipated for the principles of the present invention. Thus, FIGS. 3 through 11 should not be considered as being drawn to scale, but should be used only for conceptual purposes in understanding the broader principles of the present invention.

Referring to the specific interactive display 300 of FIG. 3, the display 300 uses the planar radiation guide 301 as both a display mechanism and an imaging mechanism. The projector 331 transmits the image into the planar radiation guide 301, where the image propagates through the radiation propagation portion 311 and is emitted through the upper surface of the radiation interface portion 312. The image is oriented upwards using the turning film 321, whereupon the diffusion film 322 diffuses the image so that image can be viewed clearly without having to be directly in front of the display. The displayed image may be visible light, infrared light, ultraviolet light, or any other light.

In order to image, a backlight 323 is used to illuminate an object in contact with or proximate the display 300. In the examples of FIGS. 3 through 11, the backlight is an infrared backlight, although other types of backlights may be used for other frequency spectrums as an alternative to or in addition to the infrared backlight. The infrared backlight 323 may be composed of an array of infrared Light Emitting Diodes (LEDs), an edge emitting infrared LED, or any other mechanism of creating infrared light, whether now known or to be developed in the future. Although not shown, the infrared backlight 323 may have a reflective coating on its underside to thereby improve the efficiency of the backlight 323.

The infrared light from the infrared backlight may be diffused light with a wide angle. Accordingly, a privacy film 324 is used to filter out only that light that is close to perpendicular to the lower surface of the radiation interface portion. Without the privacy film 324, some infrared light might be permitted to propagate down the radiation propagation portion and into the camera 332, thereby introducing noise into the imaging process. The privacy film 324 and the other privacy films described and illustrated with respect to FIGS. 4 through 11 may have a Brightness Enhancement Film (BEF) film on their lower surface. BEF filters channel much of diffuse light and direct that light upwards.

Since the IR light is more collimated by the privacy film 324, the infrared light passes through the upper surface of the radiation interface portion, having an angle that is safely greater than the critical angle needed to overcome internal reflection. The infrared light passes through the turning film 321, and through the as diffusion film 322. Note that the turning film 321 directs upwards any light that enters the turning film 321 at an angle that is close to parallel to the upper surface of the radiation interface portion of the planar radiation guide 301. In the case of the IR backlight 323, however, the turning film 321 may be of lesser significance, since the infrared light may exit the radiation interface portion at an angle that is not close to parallel to the upper surface of the radiation interface portion.

For objects that are in contact with the diffusion film 322, some of the infrared light will reflect back down through the diffusion film 322. For objects in contact with the diffusion film 322, the diffusion film 322 would have little effect so there was no distance for the light to diffuse into. However, even if the object is at a little distance from the diffusion film 322, some of that light may still reflect back down into the diffusion film 322 from the object. Nevertheless, the diffusion film 322 does tend to act as a proximity filter, tending to reflect sharper and brighter images for objects in contact with or closer to the display.

In any case, some of the reflected infrared light will pass the turning film 321 at an angle that is below the critical angle needed to overcome internal reflection. That infrared light propagates leftwards through the rest of the radiation interface and radiation propagation portions of the planar light guide 301 into the infrared camera 332. The processing system associated with the display may then deduce at what portion of the radiation interface portion the light was received based on the reflective and radial angles at which the infrared light was received at the camera 332.

FIG. 4 illustrates another specific interactive display 400 that displays using the planar radiation guide 401, but does not image using the planar radiation guide 401. The projector 431 propagates an image through the planar radiation guide a 401 where the image is passed upwards through the turning film 421 and diffusion film 422. This display mechanism may thus be similar to that described with respect to FIG. 3.

However, the imaging mechanism is somewhat different. One difference is the lack of a privacy film on the lower surface of the radiation interface portion. Since there is no camera at the left edge of the planar radiation guide 401, there is no risk of flooding that camera with noise should some of the infrared backlight propagate leftwards through the planar radiation guide. Thus, the precaution of the privacy film is less urgent. In either case, however, some infrared light that reflects from the object being imaged reflects back through the diffusion film 422 and turning film 421 into the radiation interface portion of the planar radiation guide 401.

While some of that reflected infrared light propagates back leftward through the planar radiation guide 401, some passes downward back to the infrared backlight film 423. An array of infrared cameras 432 may be placed above or below (as represented by bi-directional arrow 441) the infrared backlight 424 to receive the reflected light. In actuality, the distance between the infrared cameras 432 and the planar radiation guide 401 may be quite small.

FIG. 5 illustrates another example of a display 500 which is similar to the display 400 of FIG. 4 in that the projector 531 uses the planar radiation guide 501 to display an image through the turning film 521 and the diffusion film 522. In this case, however, the infrared backlight is provided by an infrared Light Emitting Diode (LED) 533 acting as a projector into a separate planar radiation guide 541. The light emitted from the planar radiation guide 541 is forwarded upwards using the turning film 542. From there, the infrared light passes through the planar radiation guide 501, the turning film 521, and the diffusion film 522. The infrared light is then as reflected back from the object in contact with or in front of the display, whereupon some of the reflected light passes back down through the films 522 and 521 and into the planar radiation guide 501. Some of the reflected light is propagated back to the infrared camera 532. Other reflected light may pass down from the planar radiation guide 501. Accordingly, the IR camera 532 receives the reflected image. Instead or in addition to the infrared camera 532, an array of cameras might be provided below the planar radiation guide 501, much as illustrated with respect to FIG. 4.

FIG. 6 illustrates another example of a display 600. Once again, display may occur by projector 631 transmitting an image into the left edge of the planar radiation guide 601. That projected image is directed upwards through the turning film 621 and diffusion film 622 to thereby display an image.

The planar light guide 601 also serves to provide an infrared backlight, and to receive infrared images that are reflected by objects in contact with or in front of the display 600. The infrared light source (such as an LED) 633 projects infrared light into the planar radiation guide 601. The infrared backlight is also directed upwards through the turning film 621 and diffusion film 622. The reflected infrared light is received back into the planar radiation guide, where some of the light is captured by the infrared camera 632 to thereby form an infrared image.

The technique and structure of FIG. 6 may cause some hot spots in the infrared image in which the image is flooded with reflections due to the position of the infrared LED. However, this might be compensated for by having two infrared LEDs projecting in an alternating fashion. Thus image information for the hot spot of one of the infrared LEDs may be obtained by turning that LED off, and using the other LED to source the backlight.

In one modification of FIG. 6, the IR LED 633 and the IR Camera 632 may be integrated into the projector 631. By using a technology called "scanned beam laser projection", an IR photosensor (serving as IR Camera 632) and an IR laser (serving as IR LED 633 using the term "LED" broadly) are integrated with the projector. The IR image is then captured at the same time that the visible portion of the display is being scanned. This reduces the number of components in the design. In addition, since a single photodiode and point source is used, the devices can be modulated to reduce ambient light noise (such as, for example, ambient sunlight). As a mirror scans across the display to formulate the scanned display image, the mirror also illuminates the IR image and captures the IR image. In this case, the IR photosensor may be made sensitive to the IR laser wavelength only. If the IR laser has a modulated carrier, the IR photosensors may use electronic filters to accept IR light only at that carrier frequency. Such a laser scanning camera may be used as the IR camera for each of the embodiments of FIGS. 7-10 as well. In that case, there would be no need for a separate IR illumination backlight in FIGS. 7-10.

FIG. 11 illustrates a side-view of a display 1100 that uses the planar radiation guide 1101 to perform both display and imaging. The scanning mirror 1102 receives collimated radiation 1103 that includes combined image display and image capture radiation components. For instance, the collimated radiation 1103 includes image display radiation that represents any radiation that (when propagated rightward through the radiation guide 1101) causes an image to be displayed. For instance, the image display radiation may be visible light such as, for example, combined beams of red, green and blue. In that case, the red, green, and blue components may have been generated by red, green and blue lasers (see beam sources 1105), and combined into a single beam using beam combiner 1104. Alternatively, the image display radiation may be non-visible radiation which reacts with other components optically downstream from the scanning mirror 1102 to generate light (e.g., visible light) of a suitable frequency domain for the display.

The collimated radiation 1103 also includes image capture radiation. The image capture radiation may be a beam of any frequency spectrum suitable for image capture. For instance, one of the beam sources 1105 may be an IR beam source. That IR beam might be combined into the collimated beam 1103 also using the beam combiner 1104. The beam combiner 1104 is represented abstractly as a single component. However, the beam combiner 1102 may include multiple beam combiners as needed to combine the image display and the image capture beams into a single collimated beam 1103.

The scanning mirror 1102 receives the collimated radiation 1103 and scans such radiation at suitable angles such that the collimated radiation 1103 is scanned in a suitable pattern over area of the display. The scanning mirror 1102 thus acts as a scanning-type projector. The image display radiation projected from the scanning mirror 1102 enters the planar radiation guide 1101 and results in an image being displayed via, for example, turning film 1121 and diffusion film 1122.

Since the collimated radiation 1103 also includes image capture radiation, that image capture radiation is also scanned simultaneously over the display. Thus, as radiation is displayed from a point in the display, image capture radiation may be emitted from that exact same point of the display at the exact same time. If there is an object contacting with or in front of the display, the image capture radiation may be reflected back down in reverse along the same path that it originally took from the scanning mirror 1102. The scanning mirror 1102 reflects the image capture radiation 1106 back into image capture len(s) 1107. The image capture len(s) 1107 is placed very close to the outgoing collimated beam 1103, and serves to emphasize image capture radiation that was reflected from perpendicular to the display. Thus, the photosensor 1108 detects images of objects in contact with or directly in front of the display. Although the photosensor 1108 is illustrated as being further from the beam combiner 1104, the photosensor 1108 may be placed close to the beam combiner 1104.

The displays illustrated and described with respect to FIGS. 3 through 6 all have display mechanisms that use the planar radiation guide to display images. However, the principles of the present invention also apply for displays that use the planar radiation guide as an imaging mechanism, but do not use the planar radiation guide as a display mechanism. Such is the case for FIGS. 7 through 10, which will now be described in further detail. In each of FIGS. 7 though 10, a Liquid Crystal Display (LCD) layer is illustrated as providing the displayed image. However, the principles of the present invention are not limited to this. There may be other display layers (whether now developed or to be developed in the future) that may be used to display an image.

Figure 7:
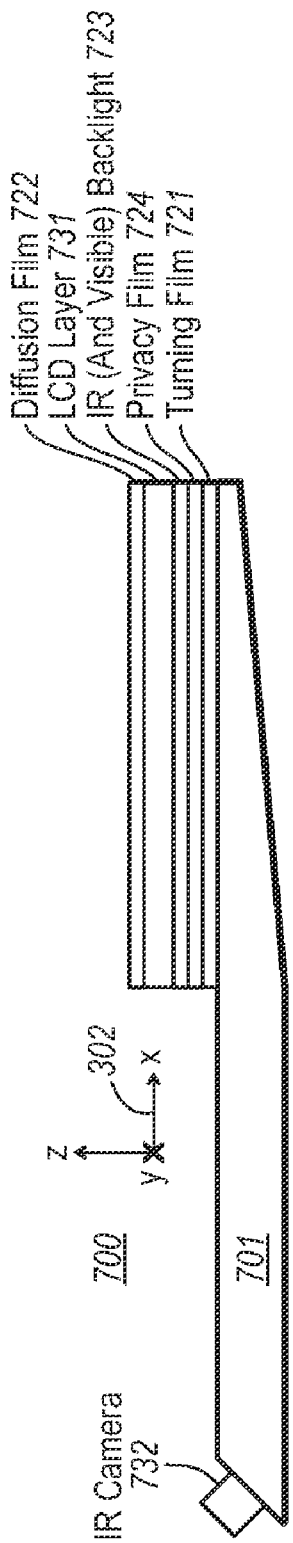
FIG. 7 illustrates a side-view of a planar radiation guide in which an LCD layer is placed above the radiation interface portion in order to display, but in which the planar radiation guide is used to image.

FIG. 7 illustrates a display 700 that uses a planar radiation guide 701 to image objects in contact with or in front of the display, but does not use the planar radiation guide to actually display. An LCD layer 731 is provided with an infrared and visible backlight 723 disposed beneath the LCD layer 731. As is conventionally known, display of images using LCD layers occurs with visible portion of the backlight being selectively permitted to pass through the LCD layer with appropriate color filtering corresponding to a spatial array of apertures. With respect to FIG. 7, the visible portion of the backlight 723 and the LCD layer 731 serve to generate an image that is projected upwards from the LCD layer 731. The displayed image from the LCD layer 731 passes up through the diffusion film 722 to be displayed to a user.

The imaging mechanism uses the infrared portion of the backlight 723 (or at least a different frequency spectrum light than was used to display). The infrared light passes up through the LCD layer 731, which is somewhat translucent to infrared light, with some of the infrared light being scattered back down due to some of the opaque portions in the LCD layer 731. The infrared light that passes the LCD layer 731 also passes through the diffusion film 722 to reflect from an object. The reflected light then passes back down through the diffusion film 722, through the LCD layer 731, and through the backlight layer 723. A privacy film 724 allows only that light that oriented approximately downward to pass. The privacy film 724 thus acts to filter much of the light that was scattered by the LCD layer 731 and the diffusion film 722. The turning film 721 turns the reflected infrared light so that the light is propagated through the planar radiation guide 701 to the infrared camera 732.

Figure 8:
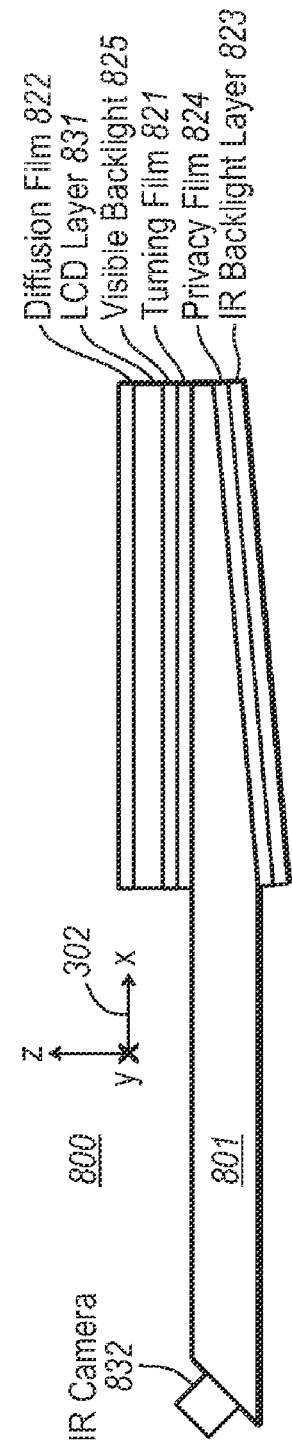
FIG. 8 illustrates a side-view of a planar radiation guide in which an LCD layer is placed above the radiation interface portion in order to display, but in which the planar radiation guide is used to image using a backlight placed below the radiation interface portion and a camera placed at the edge of the planar radiation guide.

FIG. 8 illustrates another display 800 that uses a planar radiation guide 801 to image objects in contact with or in front of the display, but does not use the planar radiation guide 801 to actually display. An LCD layer 831 is provided with a visible backlight 825 disposed beneath. Display of images occurs with the visible light from the backlight 825 being selectively permitted to pass through the LCD layer 831 with appropriate color filtering. The displayed image from the LCD layer 831 passes up through the diffusion film 822 to be displayed to a user.

The imaging mechanism uses an infrared backlight 823 to emit infrared light (or at least a different frequency spectrum light than was used to display) through a privacy film 824. The privacy film 824 orients the infrared light such that the light is does not reflect back through the planar radiation guide 801 to the infrared camera 832. Instead, the infrared light passes through the turning film 821, through the visible backlight 825, through the LCD layer 831, and through the diffusion film as 822. The infrared light that reflects from the object passes back down through the diffusion film 822, through the LCD layer 831, and through the visible backlight layer 825. Some of the infrared light passes down through the turning film 821, so that the infrared light is propagated through the planar radiation guide 801 to the infrared camera 832.

In one embodiment, and although not specifically illustrated in FIG. 8, a second planar radiation guide may be used as the infrared backlight much as described above with respect to FIG. 5. In that case, the combination of the infrared LED 533, the planar radiation guide 541 and the turning film 542 would be used in place of the infrared backlight layer 823 and privacy film 824.

FIG. 9 illustrates a planar light guide 900 in which the imaging mechanism occurs through the planar radiation guide 901, but without using the planar radiation guide 901 to display. Light from the LCD layer 931 (originating from the visible backlight 925) is permitted to simply pass upwards through the planar light guide to emit the image upwards from the planar radiation guide 901.

The imaging mechanism uses an infrared backlight 923 to emit infrared light (or at least a different frequency spectrum light than was used to display) through a privacy film 924, through the visible backlight 925, through the LCD layer 931, through the planar radiation guide 901, and reflects off the object in contact with or in front of the display 900. Some of the reflected light then propagates back through the planar radiation guide 901 to the infrared camera 932.

FIG. 10 illustrates a display 1000 that includes a planar radiation guide 1001. Display occurs using the visible portion of the backlight 1023, which is collimated using the privacy film 1024, and then selectively permitted to pass through the LCD layer 1031 to form a collimated display image. The image passes through the planar radiation guide 1001, and the diffusion film 1022. In order to minimize reflectance, a black diffusion film 1022 may be used.

Imaging occurs using the infrared portion of the backlight 1023, which is collimated by the privacy film 1024. Much of the infrared light passes through the LCD layer 1031 in still substantially collimated form. The collimated infrared light passes through the planar radiation guide 1001 and the diffusion film 1022 and reflects off the object. Some of that reflected infrared light travels to the infrared camera 1032 via the planar radiation guide 1001. One variation of FIG. 10 is that the LCD layer 1031 may be placed between the diffusion film 1022 and the planar radiation guide 1001, instead of just below the planar radiation guide 1001.

Accordingly, the embodiments have been described in which an interactive imaging display uses a planar radiation guide to perform at least one of (and potentially both of) the display and imaging operations. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for using an interactive display that includes a planar radiation guide having a radiation propagation portion and a radiation interface portion, the radiation interface portion being of non-uniform thickness, a display mechanism structured to display at the area of the radiation interface portion, and an imaging mechanism structured to image at the area of the radiation interface portion using a backlight and a camera, the method comprising:

acts of placing an object in contact with or in front of the radiation interface portion of the planar radiation guide, illuminating the object with the backlight, and interpreting light reflected by the object with the camera; and an act of interpreting an image that is displayed from the radiation interface portion of the planar radiation guide.

2. An interactive display comprising:

a planar radiation guide having a radiation propagation portion and a radiation interface portion, the radiation interface portion being of non-uniform thickness;

a display mechanism for outputting radiation from the area of the radiation interface portion;

an imaging mechanism for capturing radiation received at the area of the radiation interface portion, wherein the interactive display is structured such that at least one of the display mechanism or the camera mechanism uses the planar radiation guide such that the display mechanism uses the radiation propagation portion to propagate radiation to be displayed and emits at least a portion of such propagated radiation from the radiation interface portion if the display mechanism uses the planar radiation guide, and such that the imaging mechanism uses the radiation interface portion to receive radiation and propagates at least a portion of such received radiation down the radiation propagation portion if the imaging mechanism uses the planar radiation guide.

3. The interactive display in accordance with claim 2, the imaging mechanism comprising:

a backlight source configured to project backlight into the radiation propagation portion of the planar radiation guide; and a camera positioned at the edge of the radiation propagation portion next to the backlight source.

4. The interactive display claim 2, wherein the imaging mechanism uses a backlight positioned below the radiation interface portion of the planar radiation guide, the backlight configured to pass light through the radiation interface portion such that the passed light is emitted from the upper surface of the radiation interface portion.

5. The interactive display of claim 4, wherein the planar radiation guide is a first planar radiation guide, and the backlight comprises a second planar radiation guide.

6. The interactive display of claim 4, wherein the interactive display is structured such that the display mechanism, but not the imaging mechanism, uses the planar radiation guide, the interactive display further comprising:

an array of cameras positioned below the radiation interface portion.

7. The interactive display of claim 4, further comprising:

a privacy film at the lower end of the radiation interface portion of the display.

8. The interactive display of claim 2, wherein the interactive display is structured such that both of the display mechanism and the imaging mechanism use the planar optical radiation guide.

9. The interactive display of claim 8, further comprising:

a projector positioned at the edge of the planar propagation portion; and a camera positioned at the edge of the planar propagation portion.

10. The interactive display of claim 2, wherein the interactive display is structured such that only one of the display mechanism and the imaging mechanism uses the planar radiation guide.

11. The interactive display of claim 10, wherein the interactive display is structured such that the display mechanism, but not the imaging mechanism, uses the planar radiation guide.

12. The interactive display of claim 11, further comprising:

a projector positioned at the edge of the planar propagation portion.

13. The interactive display of claim 10, wherein the interactive display is structured such that the imaging mechanism, but not the display mechanism, uses the planar radiation guide.

14. The interactive display of claim 13, further comprising:

a camera positioned at an edge of the planar propagation portion.

15. The interactive display of claim 13, wherein the display mechanism comprises:

a display layer disposed above the radiation interface portion of the planar radiation guide.

16. The interactive display of claim 13, wherein the display mechanism comprises:

a display layer disposed below the radiation interface portion of the planar radiation guide.

17. The interactive display of claim 2, wherein the radiation propagation portion is configured to propagate at least visible light.

18. The interactive display of claim 2, wherein the radiation propagation portion is configured to propagate at least infrared light.

* * * * *